(12) United States Patent
Elkins et al.

(10) Patent No.: US 11,541,902 B2
(45) Date of Patent: Jan. 3, 2023

(54) ADAPTIVE LOCALIZED NOTIFICATIONS

(71) Applicant: TOYOTA RESEARCH INSTITUTE, INC., Los Altos, CA (US)

(72) Inventors: Michael Elkins, Framingham, MA (US); Daniel Brooks, Arlington, MA (US); Selina Pan, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/039,735

(22) Filed: Sep. 30, 2020

(65) Prior Publication Data

US 2021/0016791 A1    Jan. 21, 2021

Related U.S. Application Data

(63) Continuation of application No. 16/392,002, filed on Apr. 23, 2019, now Pat. No. 10,822,000.

(51) Int. Cl.
*B60W 50/16* (2020.01)
*B60W 50/14* (2020.01)

(52) U.S. Cl.
CPC ....... *B60W 50/16* (2013.01); *B60W 2050/143* (2013.01); *B60W 2050/146* (2013.01); *B60W 2554/4041* (2020.02); *B60W 2554/80* (2020.02)

(58) Field of Classification Search
CPC combination set(s) only.
See application file for complete search history.

(56) References Cited

U.S. PATENT DOCUMENTS

| | | | | | |
|---|---|---|---|---|---|
| 4,107,464 | A | * | 8/1978 | Lynch | G08B 27/00 340/692 |
| 5,979,586 | A | * | 11/1999 | Farmer | B60Q 9/008 180/274 |
| 9,092,953 | B1 | * | 7/2015 | Mortimer | G06F 3/016 |
| 10,822,000 | B1 | | 11/2020 | Elkins et al. | |
| 2005/0258977 | A1 | * | 11/2005 | Kiefer | G08G 1/16 340/903 |
| 2007/0109104 | A1 | * | 5/2007 | Altan | B60Q 9/008 340/407.1 |
| 2016/0171846 | A1 | * | 6/2016 | Brav | G08B 6/00 340/407.1 |
| 2017/0354196 | A1 | * | 12/2017 | Tammam | B60Q 9/008 |

* cited by examiner

*Primary Examiner* — Nabil H Syed
*Assistant Examiner* — Cal J Eustaquio
(74) *Attorney, Agent, or Firm* — Seyfarth Shaw LLP (57) ABSTRACT

A method for alerting a driver includes detecting an object in a spatial environment adjacent to a vehicle and identifying a set of output devices located within a cabin of the vehicle. Each one of the set of output devices may be located at a different location of the cabin. The method also includes selecting an output device of the set of output devices based on a location of the object in relation to the vehicle and generating a notification via the selected output device.

15 Claims, 7 Drawing Sheets

ADAPTIVE LOCALIZED NOTIFICATIONS

CROSS-REFERENCE TO RELATED APPLICATION

The present application is a continuation of U.S. patent application Ser. No. 16/392,002, filed on Apr. 23, 2019, and titled "ADAPTIVE LOCALIZED NOTIFICATIONS," the disclosure of which is expressly incorporated by reference in its entirety.

BACKGROUND

Field

Certain aspects of the present disclosure generally relate to vehicle notifications and, more particularly, to a system and method for providing information of a vehicle's surroundings via adaptive localized notifications.

Background

Vehicle collisions may occur when one vehicle is in a blind spot of another vehicle. A vehicle may be in a driver's blind spot when the vehicle is traveling, adjacent to an ego vehicle, in an area that is not visible to a driver. For example, a blind spot may exist in an area slightly behind and alongside the driver's seat of the vehicle.

Blind spot collisions occur when a driver switches lanes and is unaware that another vehicle is occupying the intended new lane. Driver blind spots exist despite the fact that vehicles are equipped with a series of view mirrors to assist the driver. The series of mirrors may include a rear view mirror that is internally mounted above a dashboard of the vehicle. The series of mirrors may also include one or two external side mirrors that are mounted near the front doors of the vehicle. The series of mirrors are designed to provide the driver to a rear view of the vehicle while the driver faces a forward direction.

External side mirrors and the rear view mirror reduce the driver blind spots. Conventional solutions for reducing collisions due to a blind spot provide blind spot warnings in respective side-view mirrors of a vehicle. It is desirable to improve conventional blind spot detection.

SUMMARY

In one aspect of the present disclosure, a method for alerting a driver is disclosed. The method includes detecting an object in a spatial environment adjacent to a vehicle. The method also includes identifying a set of output devices located within a cabin of the vehicle, each one of the set of output devices located at a different location of the cabin. The method further includes selecting an output device of the set of output devices based on a location of the object in relation to the vehicle. The method still further includes generating a notification via the selected output device.

Another aspect of the present disclosure is directed to an apparatus for alerting a driver. The apparatus having a memory and one or more processors coupled to the memory. In such aspects, instructions are stored in the memory and operable, when executed by the processor, to cause the apparatus to detect an object in a spatial environment adjacent to a vehicle. The instructions also cause the apparatus to identify a set of output devices located within a cabin of the vehicle, each one of the set of output devices located at a different location of the cabin. The instructions further cause the apparatus to select an output device of the set of output devices based on a location of the object in relation to the vehicle. The instructions still further cause the apparatus to generate a notification via the selected output device.

In another aspect of the present disclosure, a non-transitory computer-readable medium with non-transitory program code recorded thereon is disclosed. The program code is for alerting a driver. The program code is executed by a processor and includes program code to detect an object in a spatial environment adjacent to a vehicle. The program code also includes program code to identify a set of output devices located within a cabin of the vehicle, each one of the set of output devices located at a different location of the cabin. The program code further includes program code to select an output device of the set of output devices based on a location of the object in relation to the vehicle. The program code still further includes program code to generate a notification via the selected output device.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Blind spot detection systems for vehicles alert a driver that another vehicle is within their blind spot. Such conventional blind spot detection systems are static and generally provide a visual signal (e.g., signal lights on left and right rear view minors) to a driver of the vehicle. The visual signal may be provided when an object is detected within a blind spot. The visual signal may also be provided in response to the driver activating a turn signal in a direction corresponding to a location of an object in the blind spot.

Conventional blind spot notifications may be limited indicating that a vehicle is in a blind spot located on a left side, right side, front, or back of an ego vehicle. To improve safety, it is desirable to provide additional granularity for the notifications. For example, it is desirable to provide notifications beyond the conventional locations (e.g., left side, right side, front, or back), or to convey additional information. For example, the additional information may convey that a vehicle is rapidly overtaking.

Aspects of the present disclosure are directed to improved blind spot detection and notification. Specifically, aspects of the present disclosure provide localized in-vehicle notifications (e.g., left blind spot, rear left blind spot, front left blind spot, middle left blind spot, etc.) that correspond to a location of an event in a spatial environment adjacent to the ego vehicle. The notifications are dynamic and are localized within a passenger compartment in relation to a location of an event. For example, if an event (e.g., vehicle) is in a rear right blind spot, the rear right speakers may generate an audio output and/or rear right lights may be illuminated.

Additionally, or alternatively, the notifications may be dynamically provided via haptic feedback. For example, the system may vibrate a section of a seat and/or steering wheel in relation to a direction of an event. Similarly, for visual alerts, the system displays the alert relative to a location of an associated event. In this example, the system may adjust lighting throughout a passenger compartment and/or display alert icons at different locations on a windshield/head-up display (HUD).

In one configuration, the system morphs the notification (e.g., changes the sound) according to a changing condition of the event. For example, the system morphs a blind-spot notification sound into a fading sound as the vehicle moves from a rear blind spot to a front blind spot. Moreover, a precise perceived location of the sound in the passenger compartment may also be adjusted to indicate a direction of movement for the blind-spot object. Additionally, or alternatively, the type of sound may be adjusted to indicate the direction of movement.

In this way, the system uses audible notifications, visual notifications, and/or haptic notifications to indicate the occurrence of an event. The notifications may also identify a location of an event and/or changing characteristics of the event. The notifications may also be referred to as alerts.

Figure 1:
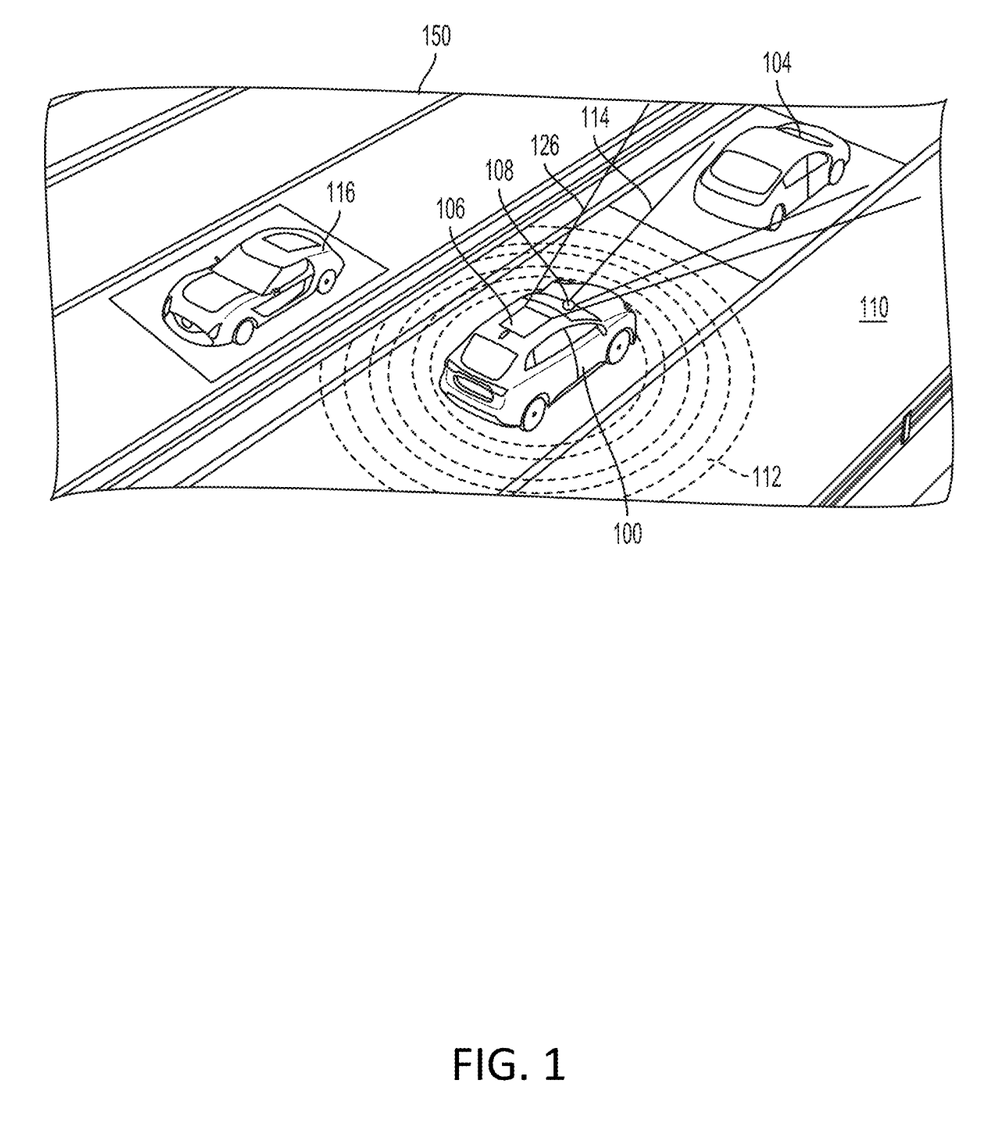
FIG. 1 illustrates an example of a vehicle in an environment according to aspects of the present disclosure.

FIG. 1 illustrates an example of a vehicle 100 (e.g., ego vehicle) in an environment 150 according to aspects of the present disclosure. In the present example, the vehicle 100 is an autonomous vehicle. As shown in FIG. 1, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may be used to evaluate a driving environment. For example, the information obtained from the sensors 106, 108 may be used to identify objects in the vehicle's 100 blind spots. The information may be used to generate one or more localized notifications.

Figure 2A:
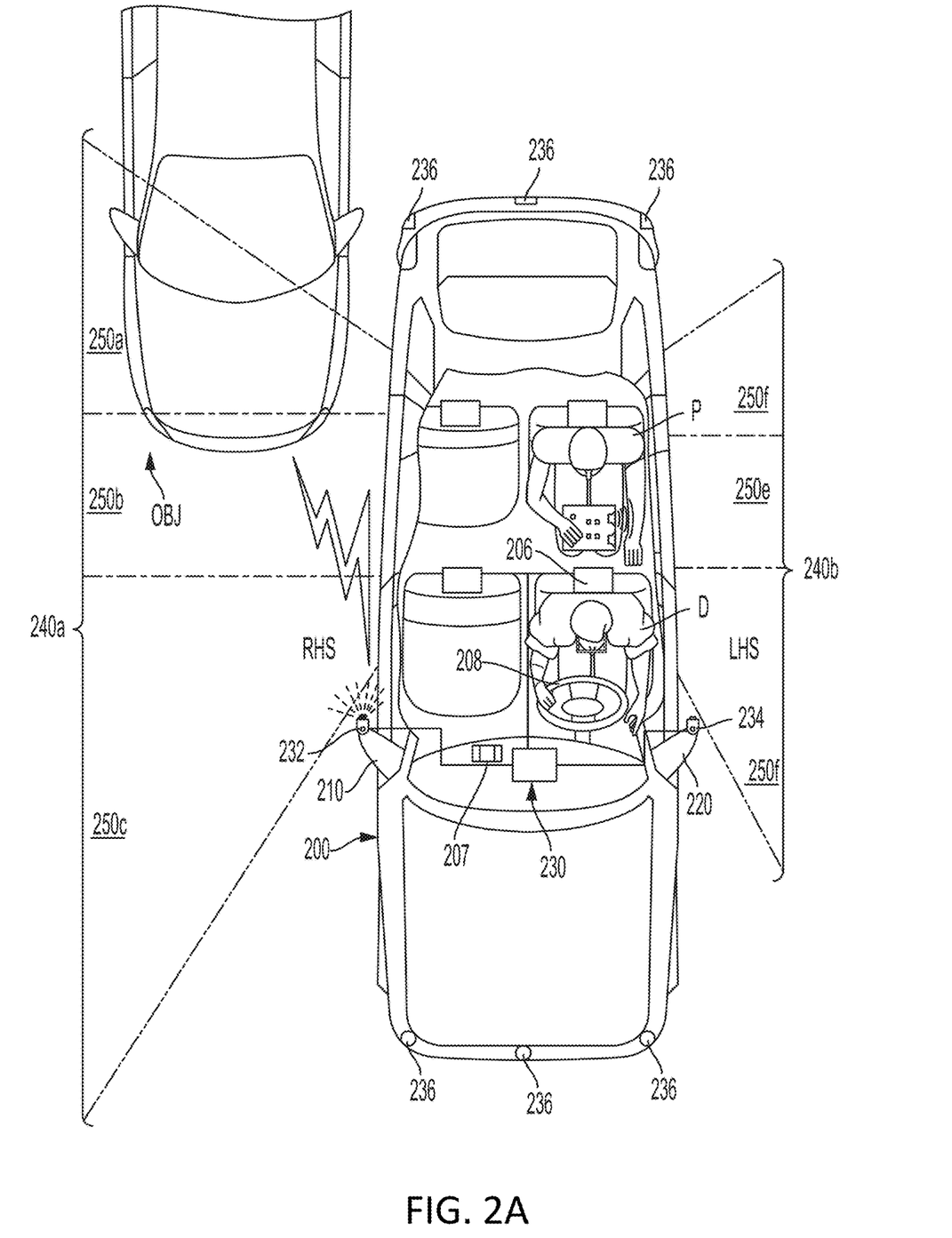
FIGS. 2A, 2B, and 2C are schematic illustration of a vehicle with an object located in the vehicle's blind spot according to aspects of the present disclosure.

FIG. 2A is a schematic of a vehicle 200 with an object 280 within a right hand side (RHS) blind spot 240a. Although the object 280 is illustrated as a vehicle, the object 280 may be any type of object (e.g., a bicycle, a tree, a pedestrian, a stationary object, etc.). The vehicle 200 can have a right rearview mirror 210, a left rearview mirror 220, and an adaptive localized notification system 230. The adaptive localized notification system 230 may be part of a driver/passenger interface device integrated with the vehicle 200.

The adaptive localized notification system 230 may be coupled to an indicator light 232 for the RHS of the vehicle 100 and an indicator light 234 for the LHS. The adaptive localized notification system 230 may include a sensor system having sensors 236 defined around the vehicle 200. For simplicity, in FIG. 2, the sensors 236 are defined in a rear section and a front section of the vehicle 200. Still, the sensors may be used to detect objects within a 360° area of the vehicle. For example, sensors (not shown) may be located proximate to indicator lights 232 and 234 as well as other portions of the vehicle 200.

The sensors 236 may detect an object within one or more blind spots, such as the RHS and/or LHS blind spots 240a and 240b. An object in a blind spot may be referred to as an event. The blind spots are not limited to the RHS blind spot 240a and the LHS blind spot 240b. The sensors 236 may detect objects in other blind spots (not shown), such as a front blind spot or a rear blind spot. The sensors 236 may provide information related to the detection to the adaptive localized notification system 230. The sensors 236 used for the blind spot detection may include RADAR, LIDAR, SONAR, or another type of sensor.

In one or more aspects, the sensor system can include one or more cameras (e.g., the camera 108 of FIG. 1). "Camera"

is defined as any device, component, and/or system that can capture visual data. "Visual data" includes video and/or image information/data. The visual data can be in any suitable form. In one or more aspects, one or more of the cameras can include a lens (not shown) and an image capture element (not shown). The image capture element can be any suitable type of image capturing device or system, including, for example, an area array sensor, a charge coupled device (CCD) sensor, a complementary metal oxide semiconductor (CMOS) sensor, or a linear array sensor. The image capture element may capture images in any suitable wavelength on the electromagnetic spectrum. The image capture element may capture color images and/or grayscale images. One or more of the cameras can be configured with zoom in and/or zoom out capabilities.

In the example of FIG. 2A, the object 280 is a motor vehicle and is detected by the sensors 236. In response to the detection, the indicator light 232 (outside the vehicle) may be illuminated as a notification to an occupant (e.g., the driver 282 or passenger 284). Additionally, or alternatively, additional notifications may be provided to the occupant. The additional notifications may be more granular in comparison to the notifications provided via an indicator light 232.

That is, the additional notifications communicate additional state information (e.g., location) to the occupant. The mechanism or system may employ different modalities to provide the information, such as audio feedback, haptic feedback, or visual feedback. In one configurator, the information is localized according to a location of an object or another aspect related to the object.

Figure 2B:
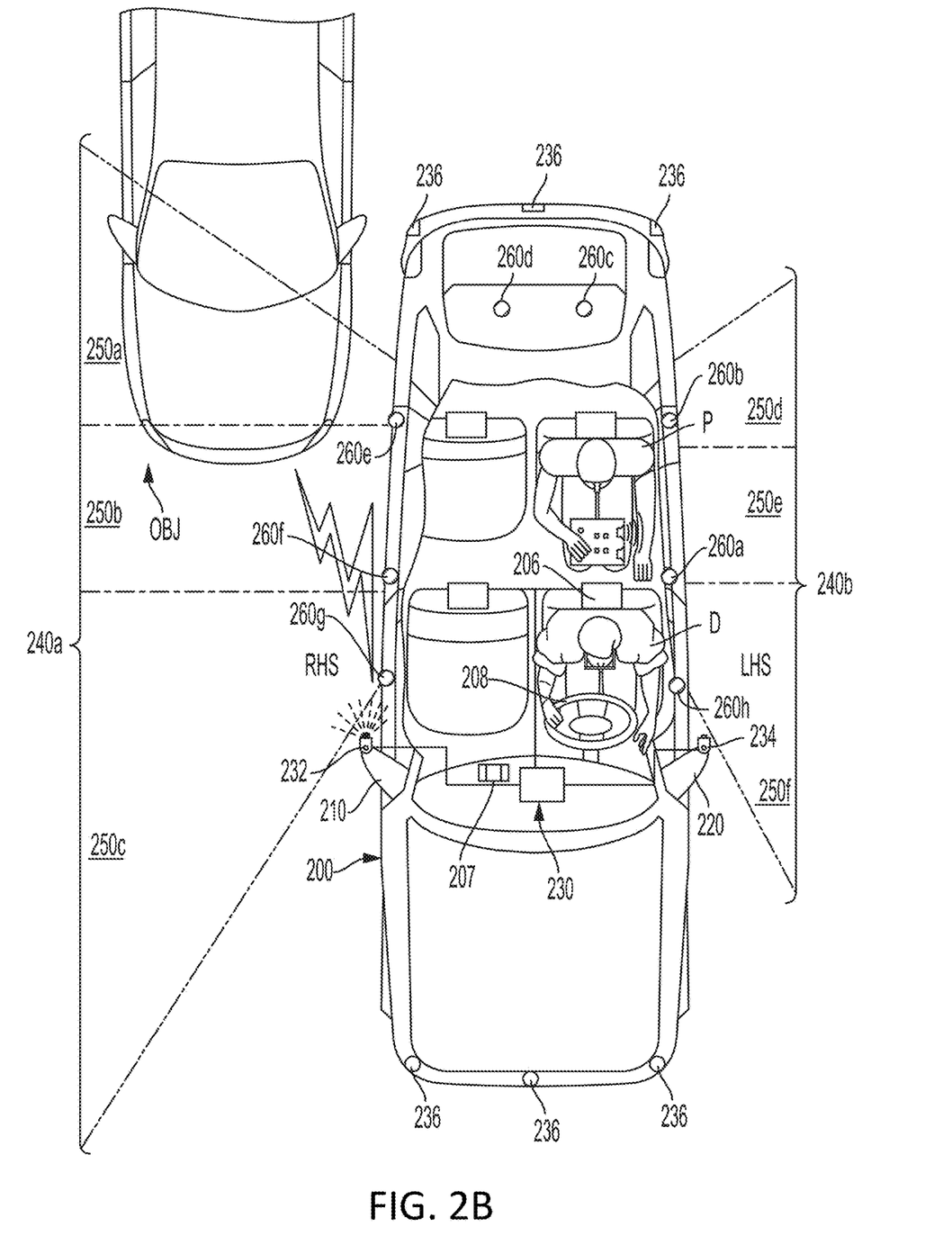
Figure 2C:
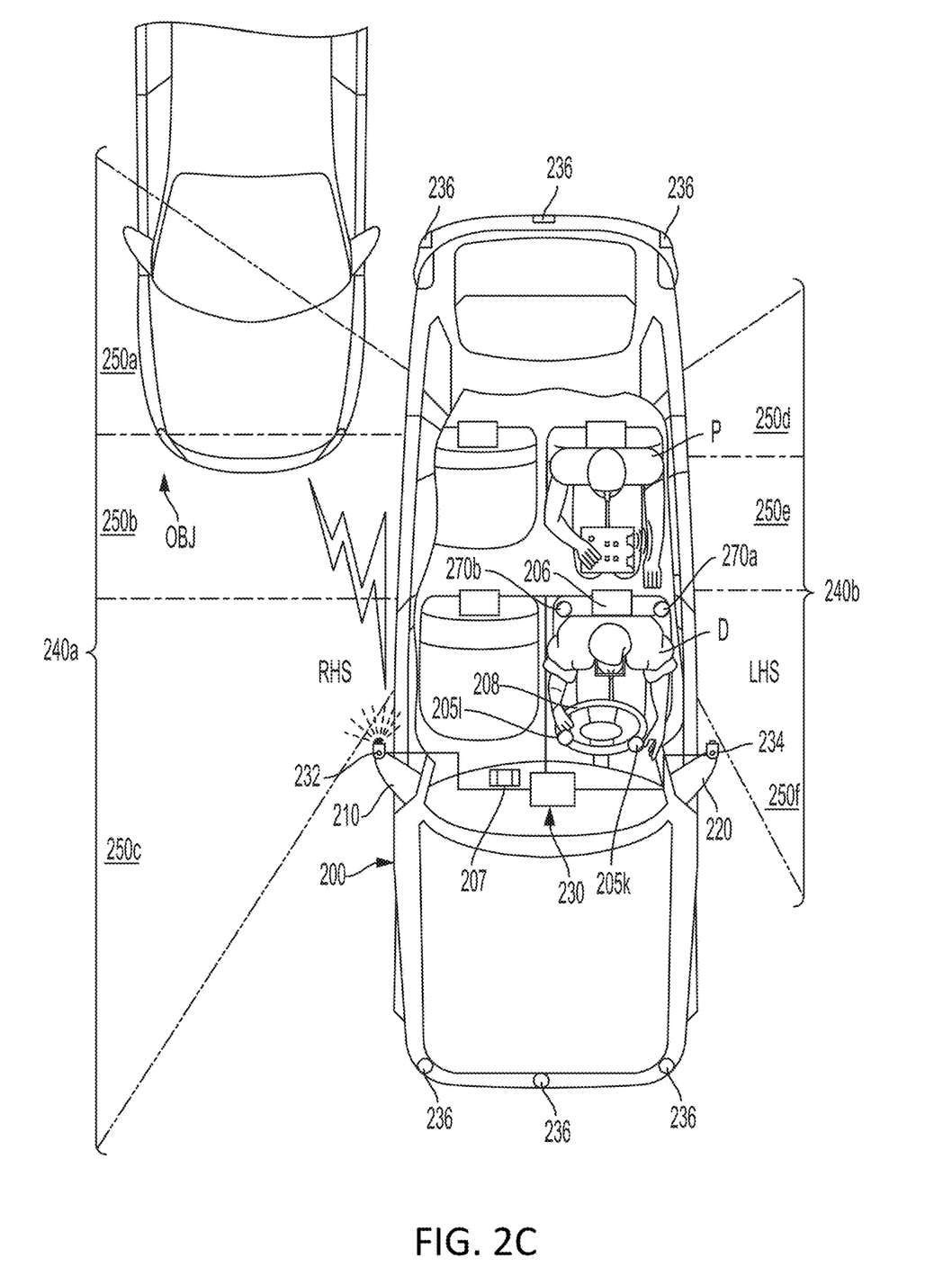

The adaptive localized notification system 230 may be connected to or wirelessly coupled to one or more sets of adaptive localized notification nodes. One set of adaptive localized notification nodes may include a set of audio notification nodes 260a-h (FIG. 2B). Another set of adaptive localized notification nodes may include haptic notification nodes 270a-d (FIG. 2C). Yet another set of adaptive localized notification nodes may include visual notification nodes. In one example, the adaptive localized notification system 230 may be directly connected to each notification node.

An existing audio speaker of the vehicle 200 may be used as one of the audio notification nodes 260a-h. Also, the audio notification nodes 260a-h may use audio output devices that are independent of the existing vehicle speakers. Aspects of the present disclosure may also use a combination of the existing vehicle speakers and independent output devices for the audio notification nodes 260a-h.

Additionally, an existing visual output device (e.g., interior light) of the vehicle 200 may be used as one of the visual notification nodes. Alternatively, the visual notification nodes may be visual output devices that are independent of the existing visual output devices. Aspects of the present disclosure may also use a combination of the existing visual output devices and independent visual output devices for the visual notification nodes (see FIG. 3).

Finally, an existing haptic output device of the vehicle 200 may be used as one of the haptic notification nodes 270a-d. Alternatively, the haptic notification nodes 270a-d may also be haptic output devices that are independent of the existing haptic output devices. Aspects of the present disclosure may also use a combination of the existing haptic output devices and independent haptic output devices for the haptic notification nodes 270a-d.

FIG. 2B illustrates an example of the vehicle 200 with audio notification nodes 260a-h according to aspects of the present disclosure. As shown in FIG. 2B, a first audio notification node 260a may be a speaker (e.g., audio output device) defined between the driver 282 and a driver side passenger 282. A second audio notification node 260b may be a rear corner driver side speaker. A third audio notification node 260c may be a back driver side speaker. The fourth audio notification node 260d may be a back passenger side speaker. A fifth audio notification node 260e may be a rear corner passenger side speaker. The sixth audio notification node 260f may be defined on a passenger side, between a front and rear passenger. The seventh localized notification node 260g may be a front corner passenger side speaker. Finally, an eighth audio notification node 260h may be a front corner driver side speaker. Aspects of the present disclosure are not limited to the audio notification node 260a-h layout of FIG. 2B, other layouts are contemplated.

The RHS and LHS blind spots 240a and 240b may be divided into multiple blind spot sub-regions. For example, the RHS blind spot 240a may be divided into a rear right blind spot 250a, middle right blind spot 250b, and a front right blind spot 250c. The LHS blind spot 240b may be divided into a rear left blind spot 250d, middle left blind spot 250e, and a front left blind spot 250f. The sensors 236 of the vehicle 200 may identify an object in the various blind spot sub-regions and provide the object's location to the adaptive localized notification system 230. The location indicates the presence of the object 280 in a specific blind spot sub-region(s).

The adaptive localized notification system 230 generate notifications, such as audio feedback, haptic feedback, visual feedback, and/or types of feedback, to convey a presence of an object 280 to an occupant of the vehicle 200. Specifically, the adaptive localized notification system 230 generates a notification to be output at one or more notification nodes based on a location of the object 280 in relation to a specific blind spot sub-region(s).

The one or more notification nodes may include notification nodes from one or more sets of notification nodes. For example, the notification node may be generated at one or more audio notification nodes 260a-h as well as one or more visual notification nodes. As another example, the notification may be exclusive to a specific set of notification nodes. For example, the notification may be exclusive to the audio notification nodes 260a-h.

The adaptive localized notification system 230 causes the blind spot notification to be generated in various locations of the vehicle 200. For example, the locations may include the rear left, rear right, front left, front right, right side, or left side of passenger compartment, driver seat, windshield, and/or steering wheel. The locations are not limited to the discussed locations, a notification may be generated at other locations.

Aspects of the present disclosure may also be used to generate a lane departure notification. The lane departure notification is generated when the vehicle 200 attempts to enter a lane currently occupied by another object (e.g., another vehicle). The lane departure warning may be localized within the passenger compartment based on a location of the object in the intended lane.

In the example of FIG. 2B, the object 280 is in the rear right blind spot 250a and the middle right blind spot 250b. In this example, the localized notification system 230 provides a signal to the fifth audio notification node 260e, the fourth audio notification node 260d, and the sixth audio notification node 260f. The signal may be transmitted via a wired or wireless connection. The signal causes each audio notification nodes 260d, 260e, 260f to output an audio notification. The audio notification alerts the driver D of the presence of an object in the rear passenger side of the vehicle (e.g., RHS).

The audio notification is not limited to the fourth, fifth, and sixth audio notification nodes 260*d*, 260*e*, 260*f*. In one configuration, because a majority of the object is in the rear right blind spot 250*a*, only the fifth audio notification node 260*e* may generate an output. Additionally, or alternatively, an intensity of an output of the fifth audio notification node 260*e* may be greater than the other notification nodes 260*d*, 260*f*.

The localized notification system 230 may be coupled to a stereo system including a stereo 207 and speakers in the compartment of the vehicle 200. The stereo system may receive signals from the localized notification system 230 to cause the speakers to produce the audio notification. In one configuration, the audio notification is prioritized over other sounds (e.g., music) from the stereo system of the vehicle 200. The audio notification may subside after the event causing the notification is mitigated. Alternatively, the music may fade when the audio notification is output.

In one configuration, rather than generating an audio notification, the localized notification system 230 localizes the music to specific audio notification nodes to alert the occupant of the event. In another configuration, an absence of sound is used to notify the occupant of an event. Directional microphones may be used for noise cancellation to generate the absence of sound in the direction of an event. For example, the music being played from the direction of the rear right blind spot 250*a* may be cancelled out to alert the driver of an object in that location, or be turned off completely to encourage the user to focus on an event. Whether the alert is prioritized over the music or other features may be based on user preference. The alert may stop after the object 280 exits the vehicle's 200 blind spot.

FIG. 2C illustrates an example of the vehicle 200 with haptic notification nodes 270*a*-*d* according to aspects of the present disclosure. For haptic feedback, the adaptive localized notification system 230 may cause a section of a seat 206 (e.g., a driver seat), a steering wheel 208, or other location to generate haptic feedback (e.g., vibrate) in relation to a direction or location of an event. The seat 206 may include a first haptic notification node 270*a* on a left side (LHS) of the seat 206 and a second haptic notification node 270*b* on a right side (RHS) of the seat 206. The steering wheel 208 may include the third haptic notification node 270*c* on a left side (LHS) and a fourth haptic notification node 270*d* on a right side (RHS).

In the example of FIG. 2C, when the object 280 is in the middle right blind spot 250*b* and/or the rear right blind spot 250*a*, the localized notification system 230 provides a signal to the second haptic notification node 270*b* that causes the right side of the seat 206 to vibrate. As another example, when the object 280 is in the front right blind spot 250*c* the localized notification system 230 may provide a signal to fourth haptic notification node 270*d* to causes the right side of the steering wheel 208 to vibrate.

For simplicity, the first haptic notification node 270*a* and the second haptic notification node 270*b* are illustrated on a backrest of the driver seat 206. The haptic notification nodes 270*a*, 270*b* are not limited to the backrest and may be located on other parts of the seat 206. For example, the seat 206 may include haptic notification nodes on the seat base or on the arm rests. Additionally, the seat 206 is not limited to two haptic notification nodes 270*a*, 270*b* and may have more or less haptic notification nodes. Furthermore, other seats in the vehicle 200 may also include haptic notification nodes.

Additionally, the steering wheel 208 is not limited to two haptic notification nodes 270*c*, 270*d*. The steering wheel 208 may include more or less haptic notification nodes. Furthermore, the haptic notification nodes may be exclusive to the seat 206 or the steering wheel 208.

Aspects of the present disclosure are not limited to the combinations of notifications discussed above. Other combinations of notification are contemplated. For example, the localized notification system may use any combination of visual feedback, audio feedback, haptic feedback, and other types of feedback to localize a notification in relation to a direction/position of an object.

In one configuration, a perceived location and/or type of the notification in the passenger compartment is adjusted to indicate a change in location of the blind spot object. Additionally, the type of feedback (e.g., type of sound, type of vibration, or color of a light) may be adjusted to indicate movement of the blind spot object.

For example, the localized notification system 230 morphs the notification according to a change in a condition (e.g., location) of the object. For example, the localized notification system 230 may change an audio output source as the object moves from one position to another in relation to the vehicle 200. The localized notification system may also change a type of output (e.g., type of sound) or an intensity of an output.

As one example, the localized notification system 230 morphs a blind-spot notification sound as the other vehicle 280 moves from a rear blind spot to a middle blind spot and then to a forward blind spot. That is, the audio output may fade from one speaker to another in relation to the location of the other vehicle 280 in relation to the vehicle 200. The pitch of the notification may be shifted to simulate the Doppler effect, to convey information about the relative speed to the driver. Morphing the output may improve the driver's D overall contextual awareness. For example, the sensors 236 may detect the specific location of the object OBJ, a velocity of the object 280 and a direction of the object 280 and provide the information to the localized notification system 230. The localized notification system 230 uses this environmental information to cause the notification to morph according to a changing condition of the notification or a changing condition of the event.

Directional feedback is not limited to changing a location and/or type of audio feedback. The location and/or type of the other feedback may also change as a location of the object 280 changes. For example, the localized notification system 230 may also cause a blind-spot notification light to dim or drift between localized notification nodes as a location of the object 280 changes in relation to the vehicle 200.

The localized notification system 230 may also change an intensity of the haptic feedback (e.g., vibration) or change a notification node as a location of the other object 280 changes in relation to the vehicle 200. The intensity refers to a strength of the haptic feedback. For example, the haptic feedback may vertically or horizontally traverse the seat 206 as the object 280 moves from a rear side blind spot to a front side blind spot.

In some aspects, a notification may be dynamically adjusted based on an assessment of the risks associated with the current event. For example, the volume of the alert, the intensity of the light, or the intensity of the haptic signal may be dynamically adjusted. In one configuration, the localized notification system 230 prioritizes the notification over other features (e.g., music). The prioritization may be based on a user configuration or an assessed risk of an event. For example, an object 280 in the LHS blind spots 240b may be prioritized over another 280 (not shown) the RHS blind spots 240a based on a size, direction, and/or velocity of the object OBJ.

Figure 3:
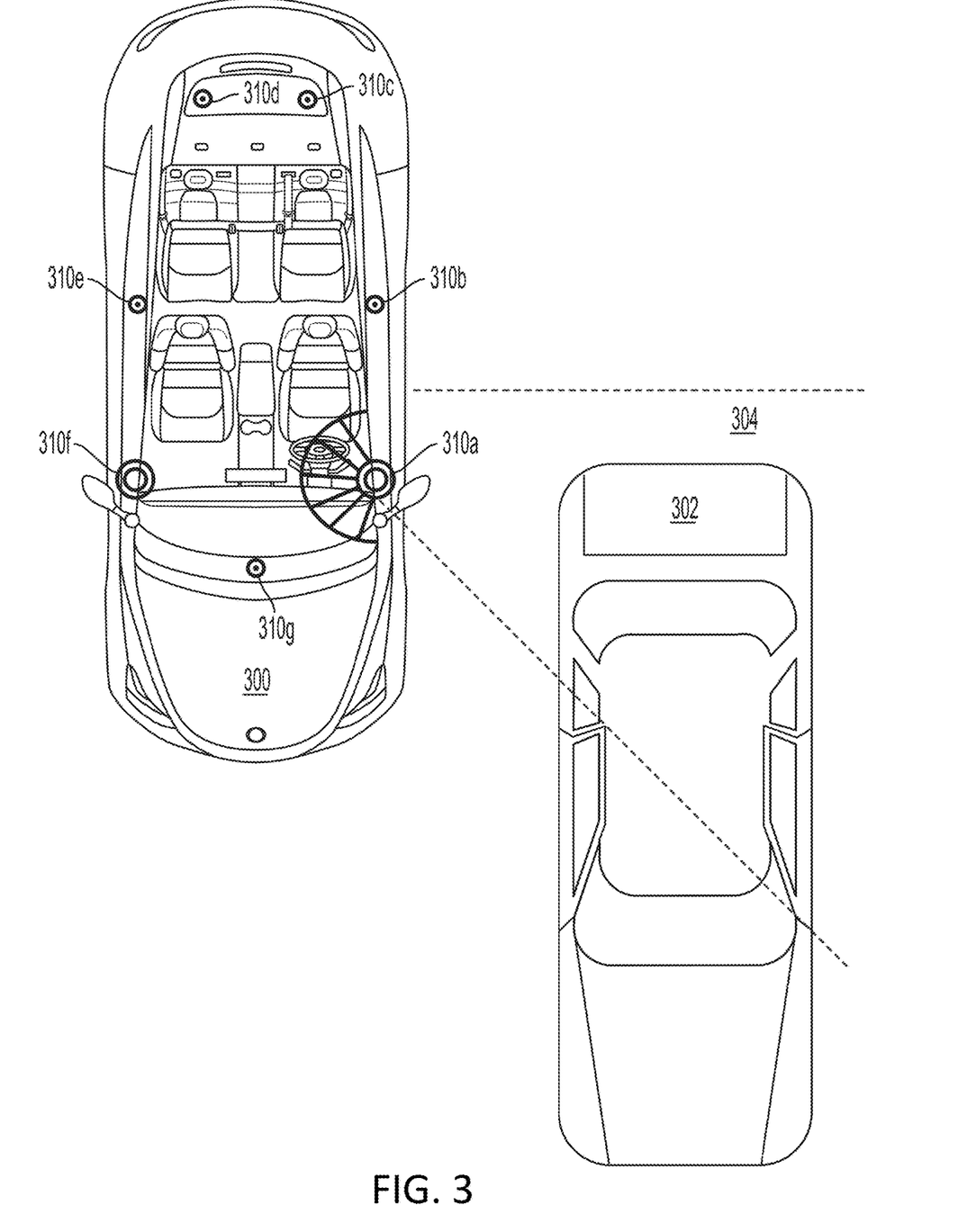
FIG. 3 is schematic illustration of a vehicle with an object located in the vehicle's blind spot according to aspects of the present disclosure.

FIG. 3 illustrates an example of generating visual notifications according to aspects of the present disclosure. As shown in FIG. 3, a vehicle 302 is in a front driver side blind spot 304. In the current example, a localized notification system generates visual notifications to alert an occupant (not shown in FIG. 3) of a location of an object in relation to the ego vehicle 300. The visual notifications may be output via lights or other visual output devices.

That is, visual notification nodes 310a-g may be defined within a passenger compartment (e.g., cockpit) of the vehicle 300. Lights or other visual output devices may be used to generate a visual output 312 from each visual notification node 310a-g. The visual output corresponds to a location of an event in a spatial environment adjacent to the vehicle 300.

In the example of FIG. 3, in response to detecting an event (e.g., the vehicle 302) in the front driver side blind spot 304, the front driver side blind spot 304 outputs a visual notification from a first visual notification node 310a. The visual notification may be a flashing light, a sustained light, or another type of visual notification.

The visual notification is not limited to a notification from one of the notification nodes 310a-g. Additionally, or alternatively, the visual notifications may be output via display alert icons at different locations on a windshield/head-up display, dashboard display, or other display. The type of visual notification may be dependent on the current interior lighting and/or exterior lighting (e.g., night time or day time).

The visual notification may be generated in response to detecting the vehicle 302. Alternatively, the visual notification may be generated in response to detecting a driver's intent to move to a location corresponding to the vehicle 302. For example, visual notification may be generated upon the driver initiating a turn signal or veering the ego vehicle 300 towards the other vehicle 302.

Figure 4:
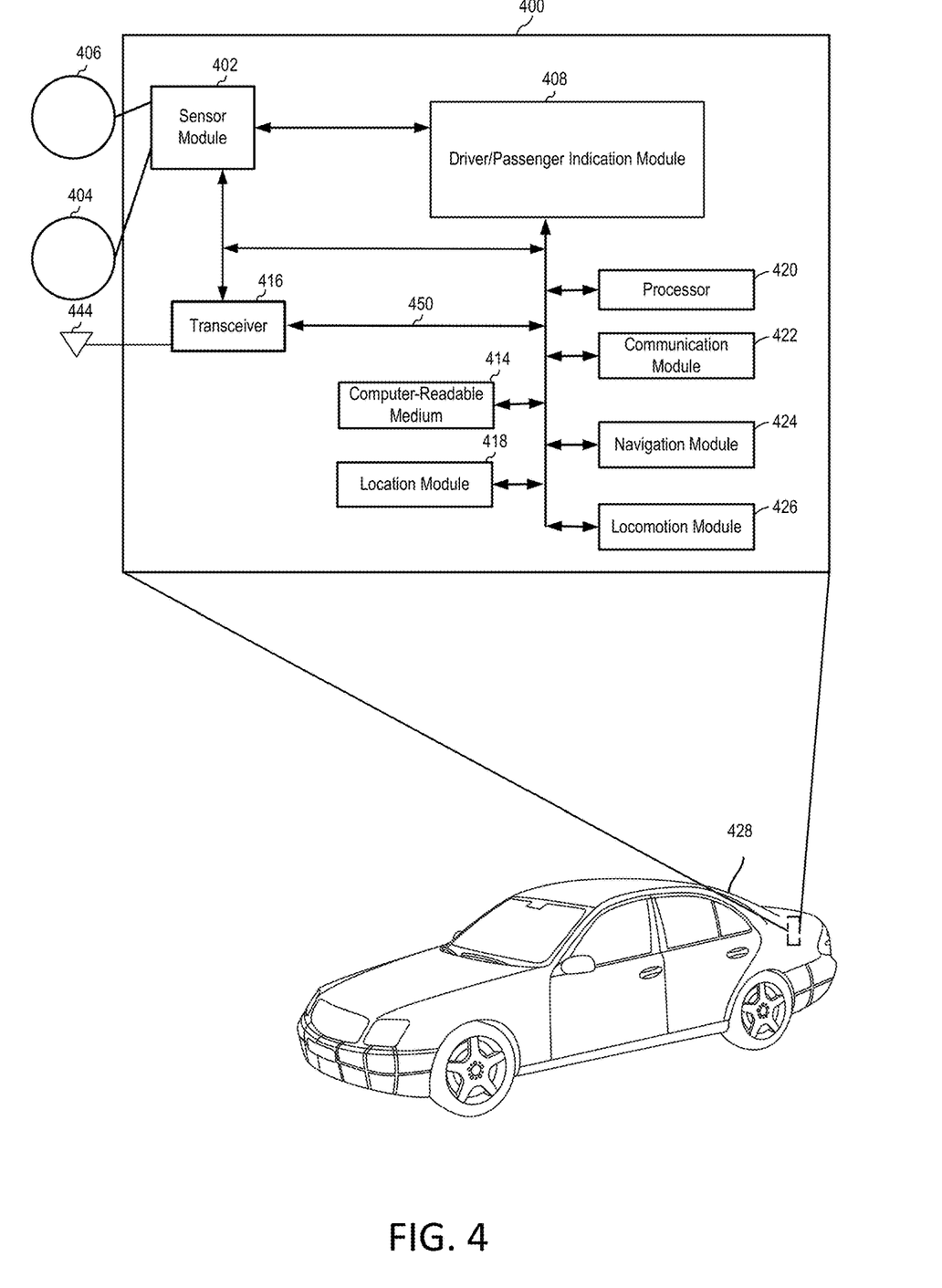
FIG. 4 is a diagram illustrating an example of a hardware implementation for an adaptive localized notification system according to aspects of the present disclosure.

FIG. 4 is a diagram illustrating an example of a hardware implementation for an adaptive localized notification system 400, according to aspects of the present disclosure. The adaptive localized notification system 400 may be a component of a vehicle, a robotic device, or another device. For example, as shown in FIG. 4, the adaptive localized notification system 400 is a component of an autonomous vehicle 428. Although the localized notification system 400 is located in the back of the vehicle 428, the localized notification system 400 may be located anywhere in the vehicle (e.g., the front of the vehicle). Aspects of the present disclosure are not limited to the autonomous vehicle 428, as other devices, such as a bus, boat, drone, or robot, are also contemplated for using the adaptive localized notification system 400. The autonomous vehicle 428 may be autonomous or semi-autonomous.

The adaptive localized notification system 400 may be implemented with a bus architecture, represented generally by a bus 450. The bus 450 may include any number of interconnecting buses and bridges depending on the specific application of the adaptive localized notification system 400 and the overall design constraints. The bus 450 links together various circuits including one or more processors and/or hardware modules, represented by a processor 420, a communication module 422, a location module 418, a sensor module 402, a locomotion module 426, a navigation module 424, a computer-readable medium 414, and a driver/passenger indication module 408. The bus 450 may also link various other circuits such as timing sources, peripherals, voltage regulators, and power management circuits, which are well known in the art, and therefore, will not be described any further.

The adaptive localized notification system 400 includes a transceiver 416 coupled to the processor 420, the sensor module 402, the driver/passenger indication module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information, environmental information and other desirable information from the driver/passenger indication module 408 to a server (not shown) or to localized notification nodes within the vehicle 428.

The adaptive localized notification system 400 includes the processor 420 coupled to the computer-readable medium 414. The processor 420 performs processing, including the execution of software stored on the computer-readable medium 414 providing functionality according to the disclosure. The software, when executed by the processor 420, causes the adaptive localized notification system 400 to perform the various functions described for a particular device, such as the autonomous vehicle 428, or any of the modules 402, 414, 416, 418, 420, 422, 424, 426. The computer-readable medium 414 may also be used for storing data that is manipulated by the processor 420 when executing the software.

The sensor module 402 may be used to obtain measurements or environmental information via different sensors, such as a first sensor 406 and a second sensor 404. For example, the sensors may detect the specific location of an object, a velocity of the object, and a direction of the object. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the communication module 422, the location module 418, the driver/passenger indication module 408, the locomotion module 426, and the navigation module 424, in conjunction with the computer-readable medium 414, to implement the functionality described herein. In one configuration, the data captured by the first sensor 406 and the second sensor 404 may be transmitted to an external device via the transceiver 416. The first sensor 406 and the second sensor 404 may be coupled to the autonomous vehicle 428 or may be in communication with the autonomous vehicle 428.

The location module 418 may be used to determine a location of the autonomous vehicle 428. For example, the location module 418 may use a global positioning system (GPS) to determine the location of the autonomous vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the autonomous vehicle 428 that are not modules of the adaptive localized notification system 400.

The locomotion module 426 may be used to facilitate locomotion of the autonomous vehicle 428. As an example, the locomotion module 426 may control the movement of the wheels. As another example, the locomotion module 426 may be in communication with a power source of the autonomous vehicle 428, such as an engine or batteries. Of course, aspects of the present disclosure are not limited to providing locomotion via wheels and are contemplated for other types of components for providing locomotion, such as propellers, treads, fins, and/or jet engines.

The adaptive localized notification system 400 also includes the navigation module 424 for planning a route or controlling the locomotion of the autonomous vehicle 428, via the locomotion module 426. The navigation module 424 may be in communication with the driver/passenger indication module 408, the sensor module 402, the transceiver 416, the processor 420, the communication module 422, the location module 418, the locomotion module 426, the navigation module 424, and the computer-readable medium 414.

The modules may be software modules running in the processor 420, resident/stored in the computer-readable medium 414, one or more hardware modules coupled to the processor 420, or some combination thereof.

According to aspects of the present disclosure, the adaptive localized notification system 400 includes a driver/passenger indication module 408 in communication with the navigation module 424, the sensor module 402, the transceiver 416, the processor 420, the communication module 422, the location module 418, the locomotion module 426, and the computer-readable medium 414.

In one configuration, the driver/passenger indication module 408 causes the multiple adaptive localized notification nodes to generate a notification based on environmental information received from the sensor module 402. For example, as shown in FIG. 2, the sensors (e.g., sensors 236) detect an object within the RHS and/or LHS blind spots 240a and 240b and provide environmental information related to the detection to the sensor module 402 of the adaptive localized notification system 240. Additional environmental information may be provided to or by the navigation module 424, the transceiver 416, the processor 420, the communication module 422, the location module 418, the locomotion module 426, and the computer-readable medium 414.

The environmental information is provided to the driver/passenger indication module 408. Based on the environmental information, the driver/passenger indication module 408 may cause the multiple adaptive localized notification nodes to provide a notification. For example, the driver/passenger indication module 408 may provide a control signal to cause an alert within the vehicle 428 that is localized to an area where the event is originated.

Figure 5:
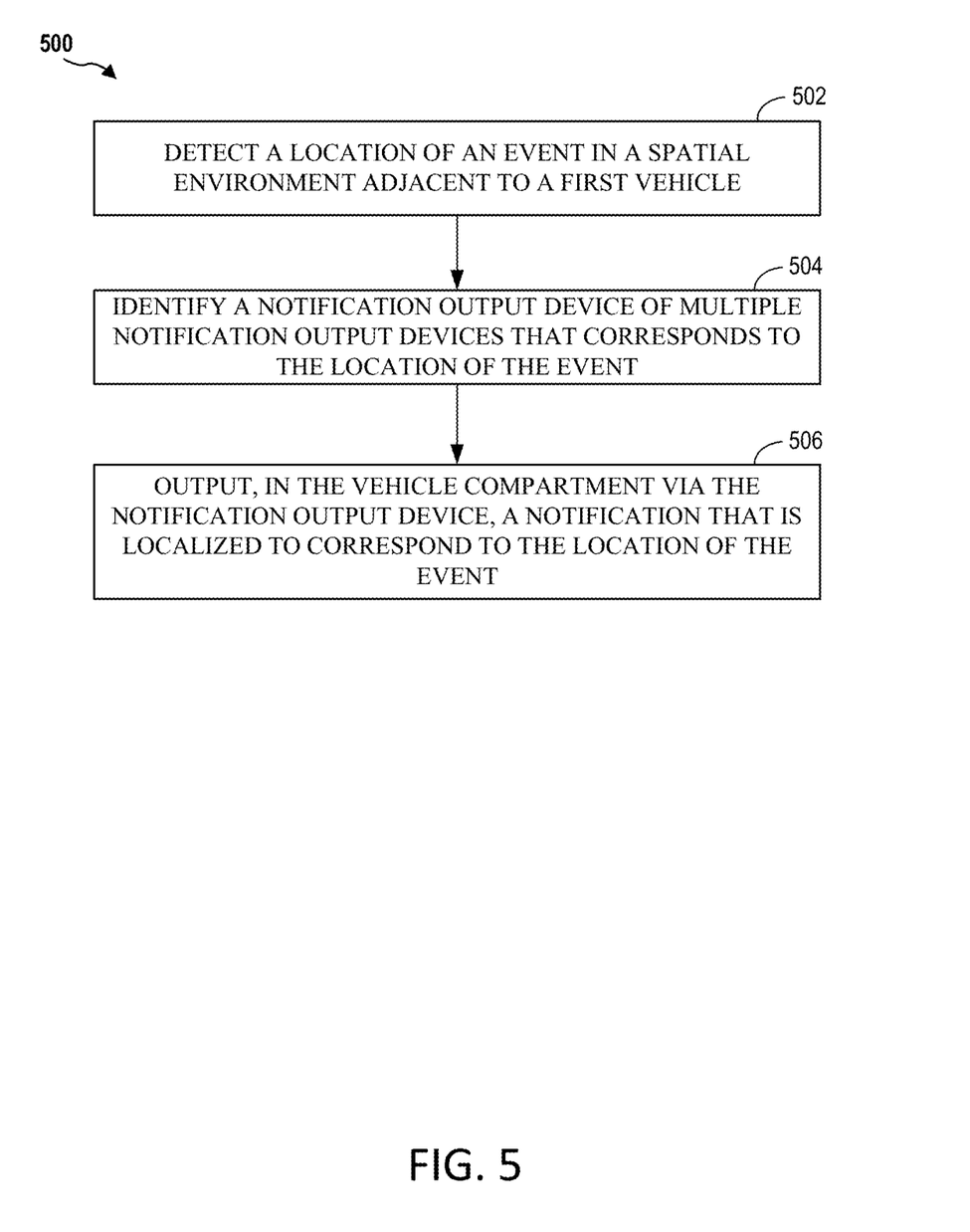
FIG. 5 illustrates a flow diagram for providing notification via an adaptive localized notification system according to aspects of the present disclosure.

FIG. 5 illustrates a method 500 for providing adaptive localized notification in a vehicle compartment according to an aspect of the present disclosure. As shown in FIG. 5, at block 502, an adaptive localized notification system detects a location of an event in a spatial environment adjacent to a first vehicle. The event may include a second vehicle or an object in a blind spot of the first vehicle. For example, as shown in FIG. 2, the sensors (e.g., sensors 236) are configured to detect an object 280 within the RHS and/or LHS blind spots 240a and 240b and provide environmental information related to the detection to the sensor module 302 of the adaptive localized notification system 230.

At block 504, the adaptive localized notification system identifies a notification output device of a plurality of notification output devices that corresponds to the location of the event. Each notification output device may correspond to a different location. Additionally, multiple notification output devices may correspond to a location. each notification output device may be coupled to an existing stereo system, an existing visual output device, and/or an existing haptic output device.

At block 506, the adaptive localized notification system outputs, in the vehicle compartment via the notification output device, a notification that is localized to correspond to the location of the event. The notification may indicate whether an object is at a front left, front right, middle left, middle right, rear right, rear left, blind spot of the first vehicle. In one configuration, the notification is morphed based on a location of a second vehicle and/or a relative speed of the second vehicle in relation to the first vehicle. The notification may be morphed into a fading sound as the second vehicle moves from a rear blind spot to a front blind spot.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for alerting a driver of a vehicle, comprising:
    detecting, while music is output via a set of output devices, an object in a spatial environment adjacent to the vehicle, the music being generated by an entertainment system of the vehicle, each output device of the set of output devices being located at a different physical location within the cabin;
    selecting a subset of output devices from the set of output devices based on identifying the set of output devices physical location of each output device of the subset of output devices corresponding to the external location of the object in relation to the vehicle; and
    localizing the output of the music from the set of output devices to the subset of output devices to alert the driver of the external location of the object.

2. The method of claim 1, in which the external location of the object corresponds to a blind spot of the vehicle.

3. The method of claim 1, wherein the object is detected via at least one sensor of the vehicle.

4. The method of claim 1, in which each output device of the set of output devices is coupled to an existing audio system.

5. The method of claim 1, in which at least one output device of the set of output devices is defined in a driver seat, a front windshield frame, or a steering wheel of the vehicle.

6. An apparatus for alerting a driver of a vehicle, comprising:
    a processor;
    a memory coupled with the processor; and
    instructions stored in the memory and operable, when executed by the processor, to cause the apparatus:
    to detect, while music is output via a set of output devices, an object in a spatial environment adjacent to the vehicle, the music being generated by an entertainment system of the vehicle, each output device of the set of output devices being located at a different physical location within the cabin;
    to select a subset of output devices from the set of output devices based on identifying the set of output devices, a physical location of each output device of the subset of output devices corresponding to the external location of the object in relation to the vehicle; and
    to localize the output of the music from the set of output devices to the subset of output devices to alert the driver of the external location of the object.

7. The apparatus of claim 6, in which the external location of the object corresponds to a blind spot of the vehicle.

8. The apparatus of claim 6, in which the object is detected via at least one sensor of the vehicle.

9. A non-transitory computer-readable medium having program code recorded thereon for alerting a driver of a vehicle, the program code executed by a processor and comprising:
    program code to detect, while music is output via a set of output devices, an object in a spatial environment adjacent to the vehicle, the music being generated by an entertainment system of the vehicle, each output device of the set of output devices being located at a different physical location within the cabin;
    program code to select a subset of output devices from the set of output devices based on identifying the set of output devices relation to the vehicle, a physical location of each output device of the subset of output devices corresponding to the external location of the object in relation to the vehicle;
    program code to determine that the set of output devices are outputting an audio signal; and
    program code to localize the output of the music from the set of output devices to the subset of output devices to alert the driver of the external location of the object.

10. The non-transitory computer-readable medium of claim 9, in which at least one output device of the set of output devices is defined in a driver seat, a front windshield frame, or a steering wheel of the vehicle.

11. The non-transitory computer-readable medium of claim 9, in which the object is detected via at least one sensor of the vehicle.

12. The non-transitory computer-readable medium of claim 9, in which the external location of the object corresponds to a blind spot of the vehicle.

13. The non-transitory computer-readable medium of claim 9, in which each output device of the set of output devices is coupled to an existing audio system.

14. The apparatus of claim 6, in which at least one output device of the set of output devices is defined in a driver seat, a front windshield frame, or a steering wheel of the vehicle.

15. The apparatus of claim 6, in which each output device of the set of output devices is coupled to an existing audio system.

\* \* \* \* \*